Jan. 1, 1963   K. G. L. KALLIN ETAL   3,070,955
ROCKET DRIVEN MISSILE INCLUDING LUMINOUS MATERIAL
Filed Sept. 18, 1959
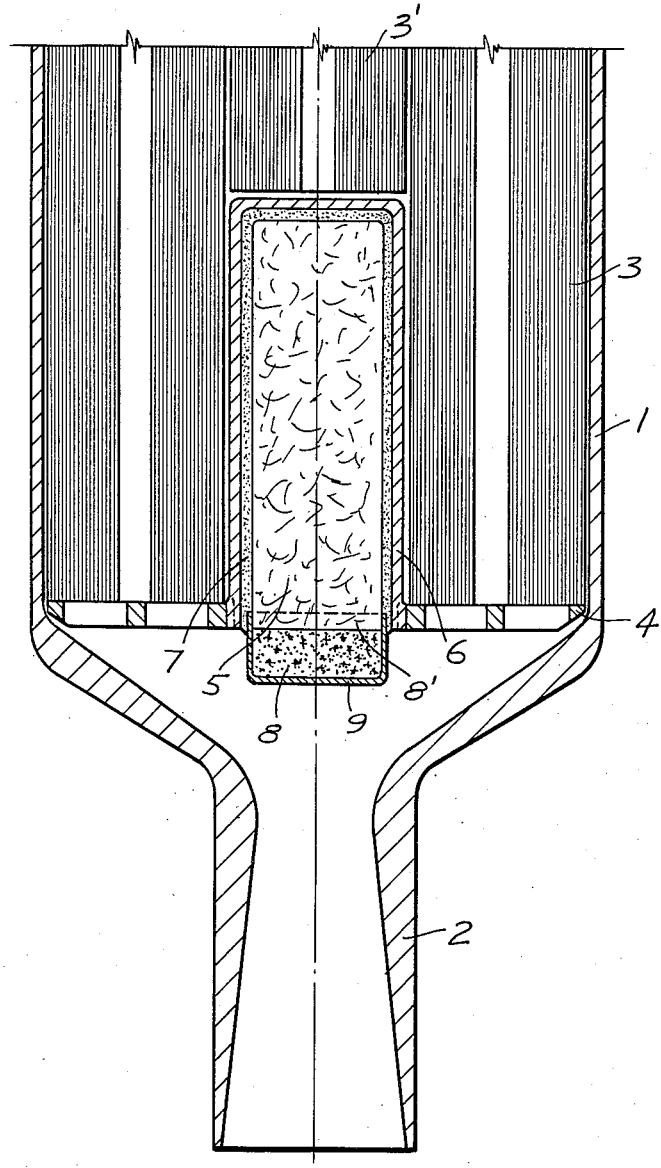
INVENTORS
KURT GÖSTA LEOPOLD KALLIN
MATS JÜRGEN MARTIN OLSSON
BY
Hane and Nydick
ATTORNEYS

United States Patent Office 3,070,955
Patented Jan. 1, 1963

3,070,955
ROCKET DRIVEN MISSILE INCLUDING
LUMINOUS MATERIAL
Kurt Gosta Leopold Kallin and Mats Jurgen Martin Olsson, Karlskoga, Sweden, assignors to Aktiebolaget Bofors, Bofors, Sweden, a company of Sweden
Filed Sept. 18, 1959, Ser. No. 840,951
Claims priority, application Sweden Sept. 20, 1958
10 Claims. (Cl. 60—35.6)

The present invention relates to rocket motors, and more particularly, to rocket-driven missiles provided with an illuminating composition which enables said missiles to be visually traced during the period of travel, or to illuminate the environment. When the composition is used for tracing, it should be ignited immediately after the firing of the missile, and when it is used for illuminating the environment, it should be ignited after the missile has reached a selected position, or in other words, the ignition of the luminous material should be delayed.

Heretofore, it has been the practice to locate luminous materials of one kind or another outside the rocket motor proper which entails that a separate igniter device must be provided to cause combustion of said luminous material.

We have found that certain well known luminous materials can be ignited as desired to provide a visual indication of the trajectory of a rocket motor or an illumination of the environment by utilizing the hot exhaust gases of the rocket motor. Accordingly, we have found that a luminous material and an igniter material for said luminous material can be disposed within the rocket motor in such a manner as to have the hot exhaust gases ignite said igniter material, which in turn is preselected to cause said luminous material to combust or burn. Thus, the present invention enables the igniter device to be eliminated with accompanying economies in cost and in weight, and without any sacrifice of efficiency.

It is an object of the present invention to provide a visual indication of the instant position of a rocket missile or to illuminate the environment by igniting a luminous material with the hot exhaust gases of the motor thereof.

Another object of the present invention is to provide an arrangement of a luminous material within the propulsion system of a missile to ignite said material with the hot exhaust gases generated during the operation of said system.

Still another object of the present invention is to provide a luminous material within the rocket motor which material is ignitable by the hot exhaust gases of said motor.

Yet another object of the present invention is to provide a luminous material and an igniter material for said luminous material within the propulsion system of a rocket to have hot exhaust gases from said system ignite said igniter material, which in turn, ignites said luminous material, providing illumination indicative of the trajectory of said rocket or of the environment.

The objects and others and advantageous features of the present invention will be forthcoming from the following detailed description when taken in conjunction with the accompanying drawing of a section of a missile, such as a missile driven by a rocket motor.

Referring now to the single FIGURE of the drawing, there is shown a section through a rear portion of a rocket motor which may be visualized as constituting part of a ballistic missile. The rocket motor comprises a substantially cylindrical casing 1 which defines a combustion chamber and which is continued into an exhaust nozzle 2 of conventional configuration. A perforated member 4, such as a screen or grid, is fitted in the combustion chamber where casing 1 changes into nozzle part 2. The combustion chamber is filled with the rocket propellant which is shown in the form of tubular or solid bars 3, uniformly distributed within the combustion chamber. Grid 4 supports the fuel bars and also prevents the same from moving toward the nozzle while permitting the flow of the hot gases which are generated in the combustion chamber when and while bars 3 are combusted, through the exhaust nozzle.

Grid 4 has a central opening in which is fitted, suitably secured to the grid, a closed container or capsule 6 of cylindrical shape. The container extends into the combustion chamber, coaxially therewith and also with the nozzle. To accommodate the container, some of the fuel bars are shortened as is shown for bars 3'. The container has a portion 9 which extends towards the nozzle and into the space between grid 4 and the throat of the nozzle. The container portions on both sides of grid 4 may be integral, but it is preferable to make the container of two parts as is shown so that each container portion can be readily constructed in accordance with its function and the specific thermal conditions to which it is subjected during the operation of the propulsion system constituted by the rocket motor. Container portion 6 is made of a metal capable of withstanding the temperatures to which it is exposed and is lined with or surrounded by a heat insulating jacket or liner 7. Liner 7 may consist of glass beads embedded in a suitable hardened binder. The thickness and other characteristics of the heat insulation are selected in accordance with the temperatures prevailing in the combustion chamber during operation. The container portion within the chamber is filled with a composition which is luminous when combusting. Various such compositions are known for the purpose. It may consist of 35% Mg, 55% $Sr(NO_3)_2$, 10% polyvinyl chloride. The container portion extending towards the nozzle is filled with an igniter material 8 which when ignited will in turn initiate the combustion of the luminous composition. Various suitable ignition compositions capable of being ignited by hot gases and of igniting, in turn, the luminous material, are well known. A composition composed of 80%, $BaO_2$, 10% Mg, 5% Al, and 5% chlorinated rubber has been found to be suitable. It would be feasible to leave the ignition composition exposed, but it is preferable to cover the ignition composition at least lightly and the walls of container portion 9 may be visualized as consisting of a thin moisture-proof material covering the ignition composition.

When the propellant fuel is ignited by any means well known for the purpose and not essential for the understanding of the invention, the hot gases generated by and during the combustion of bars 3 will be exhausted through grid 4 and nozzle 2. As a result, the gases will immediately ignite the only thinly covered or even uncovered ignition composition 8 which in turn will ignite the luminous composition 5. The ignition composition will be rapidly consumed and the now combusted luminous material, which may be powderized, will be exhausted through the nozzle together with the propellant exhaust gases substantially immediately after the rocket motor is launched or fired. The luminous tail thus left by the rocket motor will permit a visible tracing of the trajectory of the rocket motor. When it is desired to use the arrangement described herein for illuminating the environment of the rocket motor rather than merely tracing the trajectory thereof, the ignition of the luminous material by the ignition material is delayed until the rocket motor has reached a predetermined position of flight during its trajectory. This can be readily effected by appropriately selecting the gas and the composition of the ignition material or by interposing a layer 8' between the ignition material 8 and the luminous material 5 which delays the transmission of the heat of the ignited ignition material to the luminous material for an appropriate length of time. Such interposed layer 8' may be a layer of a comparatively low heat conductivity. A suitable delay composition is 55% $BaO_2$, 40% SnO, 5% polyvinyl chloride.

While the invention has been described in detail with respect to a certain now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. In a missile having a rocket motor with a combustion chamber and an exhaust nozzle for hot gases generated in said chamber, the improvement comprising an ignitable luminous material disposed in an opening surrounded by the fuel for the missile in said chamber and adjacent to said nozzle, said luminous material being insulated from heat in said chamber, and an ignited material disposed in a preselector area of the exhaust path of said hot gases to be heated to preselected temperatures thereby, said igniter material being responsive to heating for combusting said luminous material, said luminous material when combusted providing illumination.

2. In a rocket propulsion system including a combustion chamber and an exhaust nozzle for hot gases generated in said chamber, the improvement comprising a luminous material and an igniter material for said luminous material, said materials being disposed between said chamber and said nozzles in an opening surrounded by the fuel for the rocket system, said luminous material being thermally insulated from heat in said chamber, said igniter material being disposed in a preselected area the exhaust path of said gases to be heated to preselected temperatures thereby for combusting and in turn combusting said luminous material.

3. In a rocket propulsion system including a combustion chamber and an exhaust nozzle for hot gases generated in said chamber, the improvement comprising a capsule disposed in an opening surrounded by the fuel for the rocket system in said chamber and coaxial with respect to said nozzle, a luminous material and an igniter material carried within said capsule between said chamber and said nozzle, an insulating liner in said capsule, said luminous material being thermally insulated from heat in said chamber by said liner and said capsule, said igniter material being disposed in a preselected area of the exhaust path of said gases to be heated selectively thereby for igniting said luminous material to provide illumination during at least a portion of the period said system is operating.

4. A rocket motor for a missile, said rocket motor comprising a cylindrical motor casing for receiving therein solid propellant fuel adapted to generate hot gases while combusting, a nozzle member for exhausting hot gases extending from said casing coaxially therewith, a closed container mounted within the casing in an opening surrounded by the fuel and partly protruding into the exhaust path of the gases, and luminous material and igniter material filled in said container, the igniter material being located in said protruding container portion in a preselected area in the exhaust path of said gases to be heated to preselected temperatures thereby for combusting and in turn combusting said luminous material, said luminous material being thermally insulated from heat in said chamber in said capsule.

5. A rocket motor for a missile, said rocket motor comprising a cylindrical motor casing for receiving therein solid propellant fuel adapted to generate hot gases while combusting, a nozzle member for exhausting hot gases extending from said casing coaxially therewith, an elongated closed container mounted within said casing coaxially therewith and the nozzle member, and a luminous material and an igniter material for said luminous material filled in said container, the igniter material being located in said protruding container portion, said protruding container portion extending into a preselected area in said chamber to heat said igniter material to preselected temperature by hot exhaust gases for combusting said luminous material, said casing being thermally resistant to heat in said chamber to have said igniter material combust said luminous material.

6. A rocket motor according to claim 5 wherein the container portion within said casing is lined with a heat insulating material.

7. A rocket motor according to claim 6 wherein said heat insulating liner comprises glass beads embedded in a hardened binder.

8. A rocket motor according to claim 5 wherein the walls of the container portion protruding into the exhaust path of the gases are formed of a thin layer of moisture proof material covering the igniter material.

9. A rocket motor for a missile, said rocket motor comprising a cylindrical motor casing for receiving therein bars of solid propellant fuel adapted to generate hot gases while combusting, a nozzle member for exhausting hot gases extending from said casing coaxially therewith, a perforated support member adapted for supporting said fuel bars interposed between said casing and said nozzle member, a closed container, a luminous material and igniter material for said illuminous material filled in said container, said support member having a central opening for mounting said container coaxially with the casing and the nozzle member and in an opening surrounded by the fuel, a portion of the container extending into a preselected area of the flow of the exhaust gases through the nozzle member, said portion containing the igniter material which is heatable to preselected temperatures by said gases so as to ignite, said illuminous material being thermally insulated in said container from heat in said chamber and combusted by said igniter material.

10. In a rocket propulsion system including a combustion chamber and an exhaust nozzle for hot gases generated in said chamber, the improvement comprising a luminous material and an igniter material for said luminous material, said materials being disposed between said chamber and said nozzle, said igniter material being disposed in a preselected area in the exhaust path of said gases to be heated to preselected temperatures thereby for igniting and combusting said luminous material, and a delay material delaying ignition of the luminous material by the ignition material interposed between the luminous material and the igniter material said luminous material being thermally insulated from heat in said chamber by said container for being combusted by said igniter material after a delay.

References Cited in the file of this patent

UNITED STATES PATENTS

| | | |
|---|---|---|
| 2,444,957 | Skinner | July 13, 1948 |
| 2,538,333 | Schermuly et al. | Jan. 16, 1951 |
| 2,829,596 | Loedding | Apr. 8, 1958 |